United States Patent
Mahant-Shetti et al.

(10) Patent No.: US 7,068,617 B1
(45) Date of Patent: Jun. 27, 2006

(54) LOW COMPLEXITY CDMA RECEIVER

(75) Inventors: Shivaling S. Mahant-Shetti, Garland, TX (US); Kiasaleh Kamran, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/335,078

(22) Filed: Jun. 17, 1999

Related U.S. Application Data
(60) Provisional application No. 60/091,006, filed on Jun. 25, 1998.

(51) Int. Cl.
*H04B 7/216* (2006.01)

(52) U.S. Cl. .................. 370/320; 370/342; 370/441
(58) Field of Classification Search ................ 370/320, 370/375, 342, 209; 375/316, 309, 146; 714/703, 714/800, 801
See application file for complete search history.

(56) References Cited

U.S. PATENT DOCUMENTS

| | | | | |
|---|---|---|---|---|
| 5,103,459 A | * | 4/1992 | Gilhousen et al. | |
| 5,305,349 A | * | 4/1994 | Dent | |
| 5,416,797 A | * | 5/1995 | Gilhousen et al. | |
| 5,533,012 A | * | 7/1996 | Fukasawa et al. | |
| 5,566,201 A | * | 10/1996 | Ostman | |
| 5,577,025 A | * | 11/1996 | Skinner et al. | |
| 5,715,236 A | * | 2/1998 | Gilhousen et al. | |
| 5,757,767 A | * | 5/1998 | Zehavi | |
| 5,799,010 A | * | 8/1998 | Lomp et al. | |
| 5,974,584 A | * | 10/1999 | Hendrickson et al. | |
| 6,108,317 A | * | 8/2000 | Jones et al. | |
| 6,272,168 B1 | * | 8/2001 | Lomp et al. | |
| 6,493,376 B1 | * | 12/2002 | Harms et al. | |

* cited by examiner

*Primary Examiner*—Afsar Qureshi
(74) *Attorney, Agent, or Firm*—Wade James Brady, III; Frederick J. Telecky, Jr.

(57) ABSTRACT

A CDMA receiver is provided which is operable to receive a CDMA encoded signal and decode the information therein utilizing a selected code. The systems utilizes a plurality of multiply-accumulation blocks (40) which are operable to receive the signal and compare the received signal with a Walsh-Hadamard code. The comparison and the accumulation is made only in the middle of a chip clock with the edges thereof blanked. This information in the middle of the chip clock is accumulated in an accumulator, the MAC (40), for a symbol period. This is then compared with a look up table and then a decision made as to the logic value thereof.

21 Claims, 6 Drawing Sheets

FIG. 1
(PRIOR ART)

DATASTREAM FOR SIGNAL 1

FIG. 2a
(PRIOR ART)

CODE FOR SIGNAL 1

FIG. 2b
(PRIOR ART)

RESULT OF MULTIPLICATION

FIG. 2c
(PRIOR ART)

DATASTREAM FOR SIGNAL 2

FIG. 2d
(PRIOR ART)

CODE FOR SIGNAL 2

FIG. 2e
(PRIOR ART)

RESULT OF MULTIPLICATION

FIG. 2f
(PRIOR ART)

CODED SIGNAL 1

FIG. 3a
(PRIOR ART)

CODED SIGNAL 2

FIG. 3b
(PRIOR ART)

SUM OF THE TWO

FIG. 3c
(PRIOR ART)

CODE FOR SIGNAL 1

FIG. 3d
(PRIOR ART)

PRODUCT OF CODE 1 WITH THE SUM

SUM OF
THE TWO

CODE FOR
SIGNAL 2

PRODUCT OF CODE
2 WITH THE SUN

| AVERAGE −0.67 DATA DECISION =−1 | AVERAGE −1.33 DATA DECISION =−1 | AVERAGE +0.80 DATA DECISION =+1 |

FIG. 14 and output corresponding to the predetermine digital value.

LOW COMPLEXITY CDMA RECEIVER

This application claims priority under 35 USC § 119(e)(1) of provisional application No. 60/091,006, filed Jun. 25, 1998.

TECHNICAL FIELD OF THE INVENTION

The present invention pertains in general to the use of code division multiple access (CDMA) communication techniques and, more particularly, to an enhanced CDMA demodulation scheme for decoding a received CDMA signal.

BACKGROUND OF THE INVENTION

The cellular telephone industry has made phenomenal strides in commercial operations in the United States as well as the rest of the world. Growth in major metropolitan areas has far exceeded expectations and is outstripping system capacity. If this trend continues, the effects of rapid growth will soon reach even the smallest markets. Innovative solutions are required to meet these increasing capacity needs as well as maintain high quality service and avoid rising prices.

Throughout the world, one important step in the development of cellular systems is the change from analog to digital transmission. Equally important is the choice of an effective digital transmission scheme for implementing the next generation of cellular technology. Furthermore, it is widely believed that the first generation of Personal Communication Networks (PCN), (employing low cost, pocketsize, cordless telephones that can be carried comfortably and used to make or receive calls in the home, office street, car, etc.), would be provided by the cellular carriers using the next generation digital cellular system infrastructure and the cellular frequencies. The key feature demanded in these new systems is increased traffic capacity.

Currently, channel access is achieved using Frequency Division Multiple Access (FDMA) and Time Division Multiple Access (TDMA) methods. In FDMA, a communication channel is a single radio frequency band into which a signal's transmission power is concentrated. Interference with adjacent channels is limited by the use of band pass filters which only pass signal energy within the specified frequency band. Thus, with each channel being assigned a different frequency, system capacity is limited by the available frequencies as well as by limitations imposed by channel reuse.

In TDMA systems, a channel consists of a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, the problem of interference from different relative signal strength levels is reduced.

Capacity in a TDMA system is increased by compressing the transmission signal into a shorter time slot. As a result, the information must be transmitted at a correspondingly faster burst rate which increases the amount of occupied spectrum proportionally.

Figure 1:
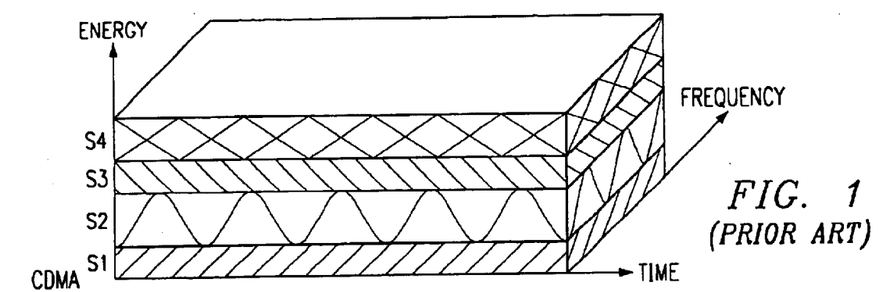
FIG. 1 illustrates diagrammatic views of a prior art CDMA access channel plot.
Figure 2A:
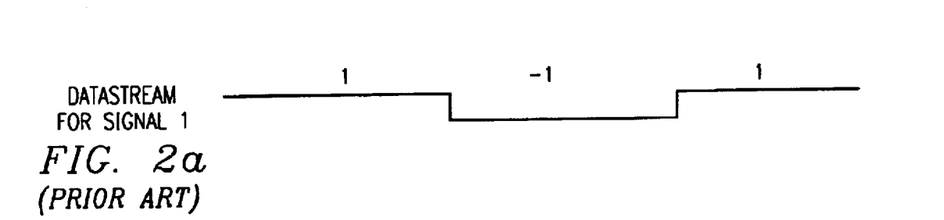
FIG. 2 illustrates a graph of the generation of a prior art CDMA signal.
Figure 2B:
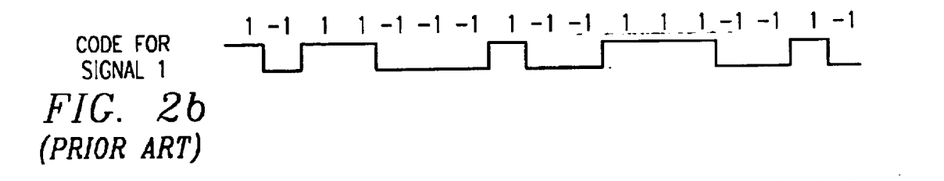
Figure 2C:
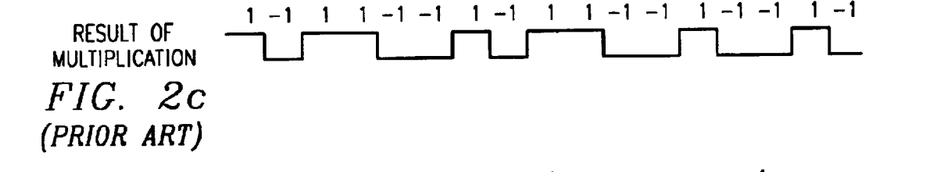
Figure 2D:
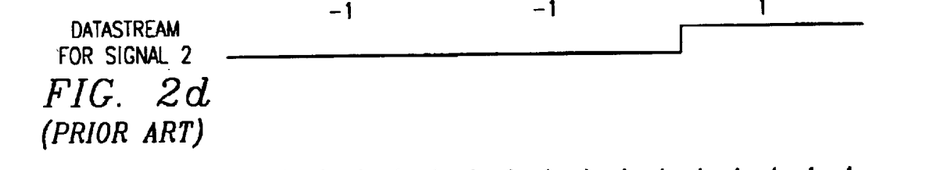
Figure 2E:
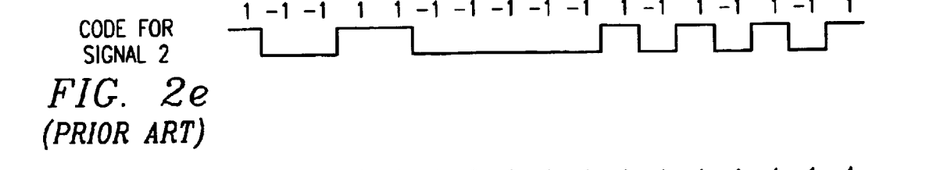
Figure 2F:
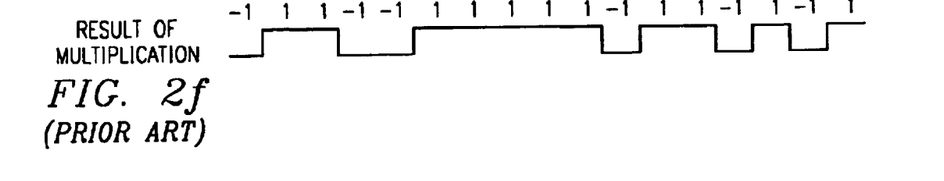
Figure 3A:
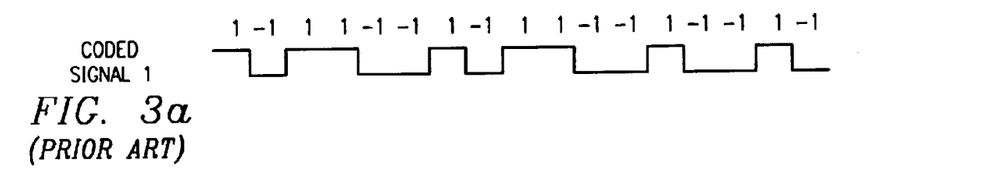
FIGS. 3 and 4 show graphs illustrating how prior CDMA signals are decoded.
Figure 3B:
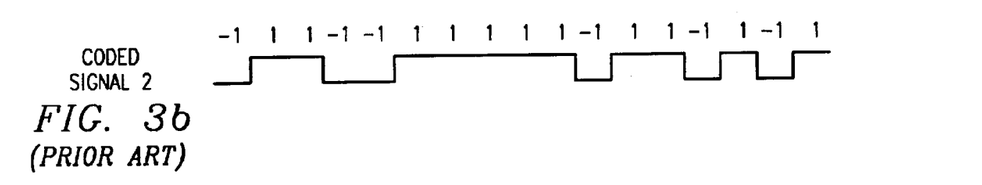
Figure 3C:
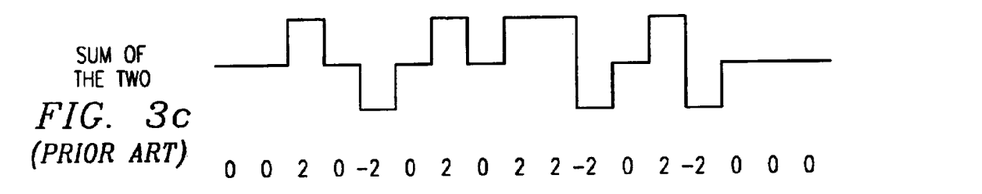
Figure 3D:
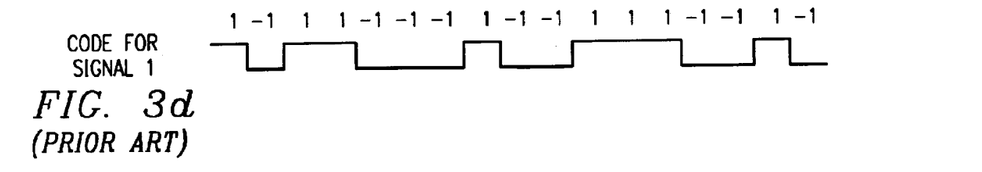
Figure 3E:
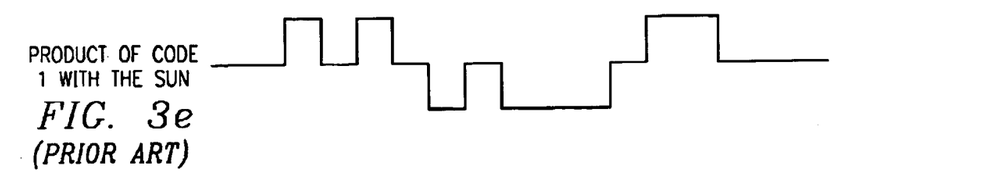
Figure 3F:
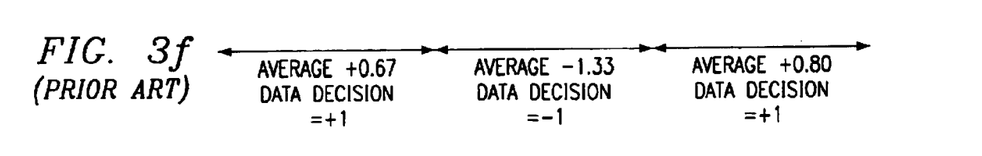
Figure 4A:
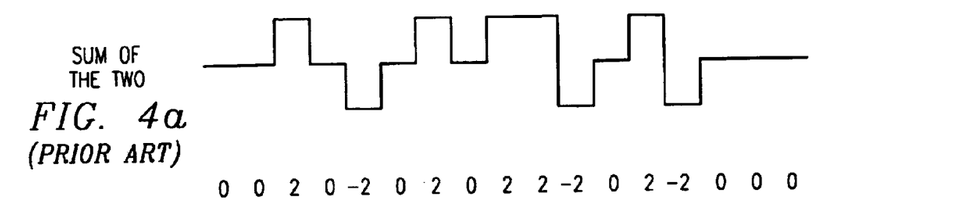
Figure 4B:
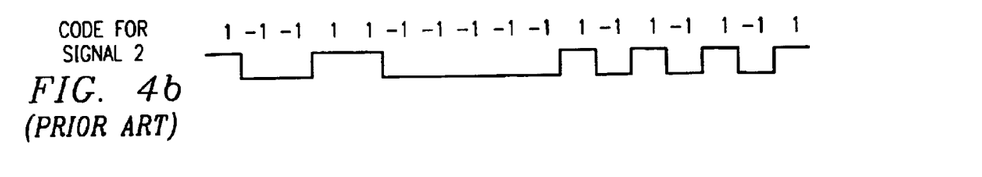
Figure 4C:
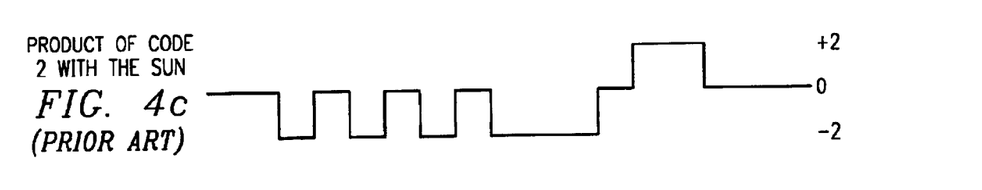
Figure 4D:
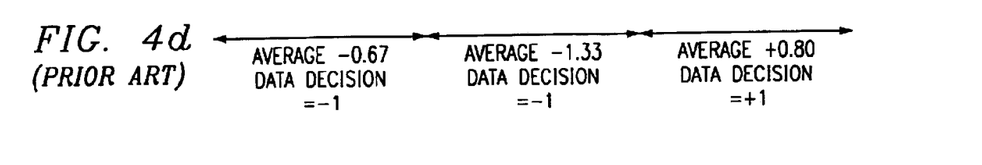

With FDMA or TDMA systems or hybrid FDMA/TDMA systems, the goal is to insure that two potentially interfering signals do not occupy the same frequency at the same time. In contrast, Code Division Multiple Access (CDMA) allows signals to overlap in both time and frequency, as illustrated in FIG. 1. Thus, all CDMA signals share the same frequency spectrum. In either the frequency or the time domain, the multiple access signals appear to be on top of each other.

In principle, the source informational data stream, e.g., speech, to be transmitted is impressed upon a much higher bit rate data stream generated by a pseudo random code generator. This combination of the higher bit rate coding signal with the lower bit rate data information stream is called coding or spreading the informational data stream signal. Each informational data stream or channel is allocated a unique spreading code. A plurality of coded information signals are modulated and transmitted on a radio frequency carrier wave. A composite signal of multiple coded signals is received at a receiver. Each of the coded signals overlaps all of the other coded signals, as well as noise-related signals, in both frequency and time. The composite signal is demodulated and correlated with a selected spreading code. Correlation by code isolates and decodes a corresponding error-coded signal.

There are a number of advantages associated with CDMA communication techniques. The capacity limits of CDMA-based cellular systems are projected to be up to twenty times that of existing analog technology as a result of the properties of a wide band CDMA system, such as improved coding gain/modulation density, voice activity gating, sectorization and reuse of the same spectrum in every call. CDMA is virtually immune to multi-path interference, and eliminates fading and static to enhance performance in urban areas. CDMA transmission of voice by a high bit rate decoder insures superior, realistic voice quality. CDMA also provides for variable data rates, allowing many different grades of voice quality to be offered. The scrambled signal format of CDMA completely eliminates cross talk and makes it very difficult and costly to eavesdrop or track calls, insuring greater privacy for a callers and greater immunity from air time fraud.

Despite the numerous advantages afforded by CDMA, the capacity of conventional CDMA systems is limited by the decoding process. Because so many different user communications overlap in time and frequency, the task of correlating the correct information signal with the appropriate user is complex. In practical implementations of CDMA, capacity is limited by the signal-to-noise ratio (S/N), which is essentially a measure of the interference caused by other overlapping signals as well as background noise. The problem to be solved, therefore, is how to increase system capacity and still be able to maintain a reasonable signal-to-noise ratio so that signal decoding can be carried out efficiently and accurately.

SUMMARY OF THE INVENTION

The present invention disclosed and claimed herein comprises a CDMA decoder for decoding a CDMA encoded signal from a desired CDMA channel. The decoder includes a code generator for generating a predetermined CDMA code for an associated CDMA channel that corresponds to an encoded signal encoded with a corresponding CDMA code. The signal is received on a receive input and then input to a multiply/accumulation device. The multiply/accumulation device is operable to multiply the received signal on the receive input by the code word generated by the code generator while operating in the analog domain. The multiply/accumulation device is operable to accumulate the results of the multiplication operation over a symbol period to provide an analog result. A data conversion device then determines if the analog result corresponds to a predetermined digital state and, if so, it then generates a digital output corresponding to the predetermine digital value.

In another aspect of the present invention, the code generator operates on a chip clock such that the code word is clocked by the chip clock. The chip clock changes from one logic state to a second logic state with the multiply/accumulation device operating during the one logic state. The multiply/accumulation device further includes a blanking device for blanking at least one of the leading or lagging edges of the chip clock at one logic state for a predetermined blanking duration. During this blanking duration, the operation of the multiply/accumulation device is inhibited so as to prevent accumulation of information therefrom.

In yet another aspect of the present invention, the code generator is operable to generate a plurality of CDMA codes, each associated with one of a plurality of CDMA channels such that the receive input can receive an plurality of CDMA encoded signals, each on a different channel. A plurality of multiply/accumulation devices are provided, one for each channel and for each code word generated by the code generator. The data conversion device in each of the multiply/accumulation devices is then operable to determine for the associated multiply/accumulation device if the associated analog result corresponds to the predetermined digital state. If so, a digital output is generated for that multiply/accumulation device.

In yet a further aspect of the present invention, a subtraction device is provided for subtracting from the output analog results of each of the multiply/accumulation device contributions from signals on selected ones of the other channels that are received by the given multiply/accumulation device such that interference from information on other channels associated with other code words is minimized.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Referring now to FIG. 2, there is illustrated a series of graphs for the operation of generating an encoded signal. There are provided two data streams, a data stream 1 and a data stream 2, in graphs (a) and (d). These two data streams are communicated over two separate communication channels. The first signal, signal 1, is modulated using a high bit rate, a digital code unique to signal 1 as illustrated in graph (b). For the purposes of the present invention, the term "bit" refers to one digit of the information signal. The term "bit period" refers to the time period between the start and the finish of the bit signal. The term "chip" refers to one digit of the high rate coding signal. Accordingly the "chip period" refers to the time period between the start and the finish of the chip signal. Naturally, the bit period is much greater than the chip period. The result of this modulation, which is essentially the product of two signal waveforms, is shown in the signal graph (c). In Boolean notation, the modulation of two binary waveforms is essentially an exclusive-OR operation. A similar series of operations is carried out for signal 2 as shown in the signal graphs (d)–(f). In practice, of course, more than two coded information signals are spread across the frequency spectrum and made available for cellular telephone communications.

Each signal is utilized to modulate an RF carrier using any one of a number of modulation techniques, such as Quadrature Phase Shift Keying (QPSK). Each modulated carrier is transmitted over an air interface. At a radio receiver such as a cellular base station, all of the signals that overlap in the allocated frequency bandwidth are received together. The individually coded signals are added, as represented in the signal graphs (a) and (c) of FIG. 3, to form a composite signal waveform.

After demodulation of the received signal to the appropriate baseband frequency, the decoding of the composite signal takes place. Signal 1 may be decoded or despread by multiplying the received composite signal in the signal graph (c) with the unique code used originally to modulate signal 1, as shown in the signal graph (d). The resulting signal is analyzed to decide the polarity (high or low, +1 or −1, "1" or "0") of each information bit period of the signal.

These decisions may be made by taking an average or majority vote of the chip polarities during one bit period. Such "hard decision" making processes are acceptable as long as there is no signal ambiguity. For example, during the first bit period in the signal graph (f), the average chip value is +0.67 which readily indicates a bit polarity of +1. Similarly, during the subsequent bit period, the average chip value is −1.33. As a result, the bit period was most likely a −1. Finally, in the third bit period, the average is +0.80 which indicates a bit polarity of +1. However, whenever the average is 0.0, the majority averaging test fails to provide an acceptable polarity value.

In ambiguous situations, a "soft decision" making process must be utilized to determine the bit polarity. For example, an analog voltage proportional to the received signal after despreading may be integrated over the number of chip periods corresponding to a single information bit. The sign or polarity of the net integration result indicates that the bit value is a +1 or a −1.

The decoding of signal 2, similar to that of signal 1, is illustrated in the signal graphs (a)–(d) of FIG. 4. After decoding, there are no ambiguous bit polarity situations.

Figure 5:
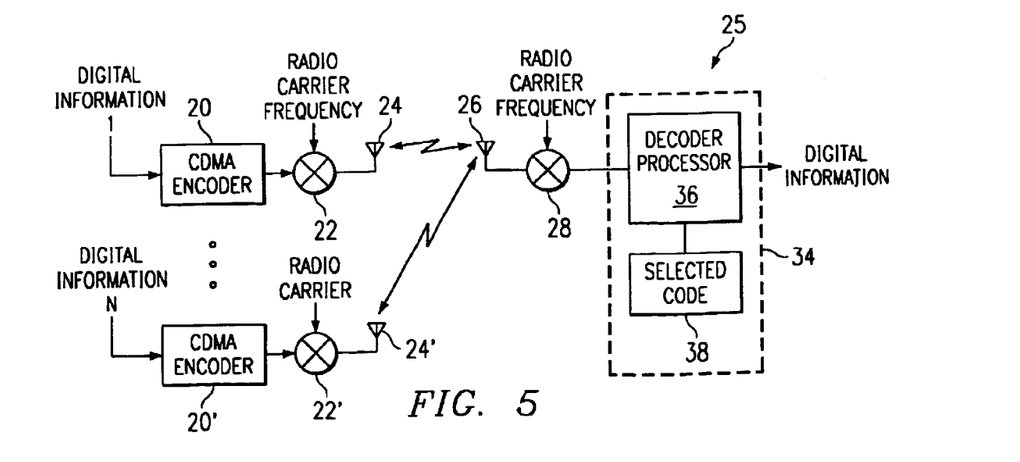
FIG. 5 illustrates a diagrammatic view of a CDMA communications system for encoding information onto a carrier and then decoding information from the carrier.

Referring now to FIG. 5, there is illustrated a diagrammatic view of a conventional CDMA system utilizing the decoder of the present invention. A plurality of CDMA encoders 20 are provided which receive digital information data streams 1 through N. Each of the CDMA encoders 20 has the output thereof connected to a respective mixer 22 which is modulated with an RF carrier. This provides a modulated carrier on the output thereof which is transmitted over an air interface from a transmitting antenna 24 to a receiving antenna 26. At the receiving end, the received signal is demodulated with a mixer and the appropriate RF carrier, and then input to a decoder 34. The decoder 34 includes a decoder processor 36 which receives on the input thereof a selected code stored in a register 38. This provides on the output thereof the decoded digital information corresponding to the selected code 38. In conventional systems, the decoder 34 would extract the desired signal from the composite signal by multiplying the corresponding code in the register 38 which was used to originally code the desired signal in the CDMA encoder 20 with the composite signal. In theory, only the appropriate signal is correlated and reconstructed in the decoder 34, as will be described in more detail hereinbelow.

Figure 6:
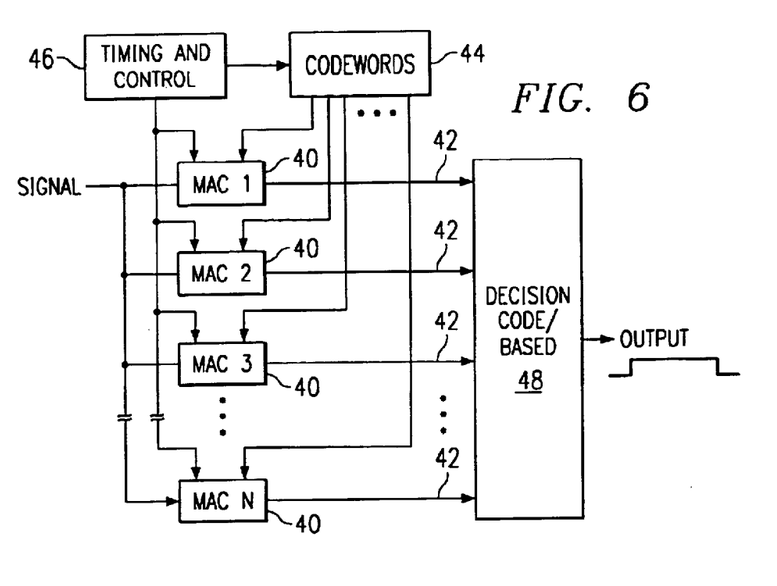
FIG. 6 illustrates a diagrammatic view of the decoder of the present invention.

Referring now to FIG. 6, there is illustrated a block diagram of a decoding scheme utilizing multiple decoders, wherein each of the decoders is comprised of a multiply-accumulation block (MAC) 40 labeled MAC1, MAC2, MAC3 . . . MACn. Each of the MAC blocks 40 is operable to perform a multiply/accumulation operation. Each of these MAC blocks 40 corresponds to a single desired signal and, therefore, have associated therewith the code corresponding to the desired signal. The signal is input to each of these MAC blocks 40 and a correlation output is provided on output lines 42. The code words are generated in a code word block 44, one for each of the MAC blocks 40, with timing and control performed by block 46. The correlation outputs on lines 42 are input to a decision block 48 which generates an output signal based upon the correlation.

Each bit period is divided into m chip intervals with the code, a pseudo random (PN) code, and then transmitted in that particular bit period. The PN code that is utilized in the present invention is a Walsh-Hadamard code, which is a conventional coding system for generating a sequence of values as a PN code. The link m is a power of 2 and typical values for m are 64, 128 and 256. To limit the bandwidth and to minimize inter-chip interference, the encoding scheme will typically use some type of raised cosine or square-root raised cosine filtering on the outgoing CDMA signal. In general, since the waveforms are transmitted synchronously, and hence are received synchronously at the receiver, there is virtually no inter-channel interference. Conventional systems detect the incoming signal by first digitizing the incoming signal with a high frequency multiple bit A/D converter, performing multiple samples for each chip, and then choosing a proper sampling point, followed by the necessary addition or subtraction of the samples, depending on the chip value of the originating code. This would then use, in a conventional system, a matching square root raised cosine filter which requires considerable silicon area. As will be described hereinbelow, rather than choosing a sample point, part of the chip period at the beginning and at the end is excluded or "blanked." The reason for this is that the motivation behind the filtering concept is to smooth the transitions. Although the Walsh-Hadamard waveforms are orthonormal, the smoothed Walsh-Hadamard waveforms are not orthonormal. However, the removal of the smoothed ends restores sufficient orthonormality to the waveform to result in a reasonable performance. The present system replaces both the high frequency A/D converter, matching filter and added subtractor.

In the present embodiment, the CDMA receiver is designed to operate in a 1.25 MHz bandwidth range. More specifically, the wideband spectrum (12.5 for North American Digital Cellular user (NADC)) is divided into blocks of 1.25 MHz frequency bands, enabling one to benefit from a hybrid CDMA/Frequency-Division Multiple-Access (FDMA) scenario. The 1.25 MHz bandwidth is capable of handling several signals within the bandwidth. Each of the signals utilizes the full bandwidth but is separated from other signals through the use of a Walsh-Hadamard basis function. Each bit period, as described hereinabove, may produce up to 256 chip symbols. That is, each bit symbol is multiplied by an up to 256 long sequence of chip symbols. The number of chips per an information symbol or bit period is known as the processing gain. In a typical IS-95 system, a processing gain of 64 is utilized. The resulting chip stream is then passed through a bandlimiting filter, such as a square-root raised cosine filter, for transmission through a bandwidth-constrained channel.

The general approach utilized in the present decoder requires generation of one or more Walsh-Hadamard basis functions for a given code at the chip rate, and then the performance of a continuous time multiplication of the received analog signal with the locally generated code (or codes). It is assumed that PN code acquisition has been achieved, and that the small error between the local and the received PN codes is limited to only a fraction of the chip duration. At the end of a bit period (i.e., 256 chip time), a decision is made by the decision block 48 regarding the transmitted bit that is rendered. The net effect is that bit discrimination at a very low data rate is needed, as compared to a conventional operation wherein digital samples obtained at a rate that is several times the chip rate must be manipulated by the decoder 34 to render bit decisions and the number of bits required is large. As will be described hereinbelow, no explicit matched filters are implemented; that is, the need for a square-root raised cosine filtering operation has been eliminated and the number of bits required is substantially reduced.

Figure 7:
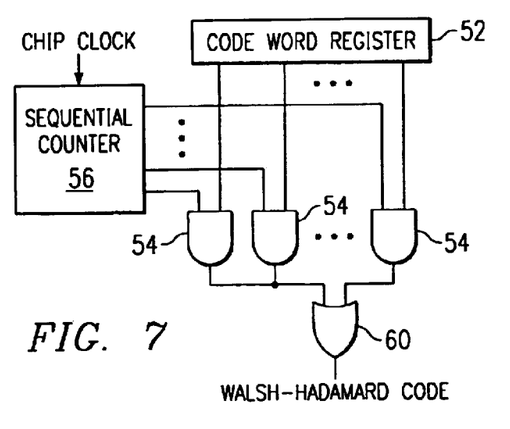
FIG. 7 illustrates a logic diagram for the co-generation portion of the decoder.

Referring now to FIG. 7, there is illustrated a logic diagram for the code word generator 44. As described hereinabove, the code for each bit period or symbol is comprised of a sequence of "1's" and "0's," each being one chip clock period in length. The code is generated by first storing a code word in a code word register 52. This is an 8-bit register, each bit input to one input of a two-input AND gate 54, there being eight AND gates 54. The other input of the AND gates 54 are connected to one of eight outputs of an 8-bit sequential counter 56, which is clocked by the chip clock. The output of each of the AND gates 54 are input to one input of an 8-input Exclusive-OR gate 60. The output of OR gate 60 comprises the Walsh-Hadamard code. This is the code for a single input signal decode operation. Therefore, for each signal that is to be extracted from the input signal, a separate code generator of the type described with respect to FIG. 7 is required.

Figure 8:
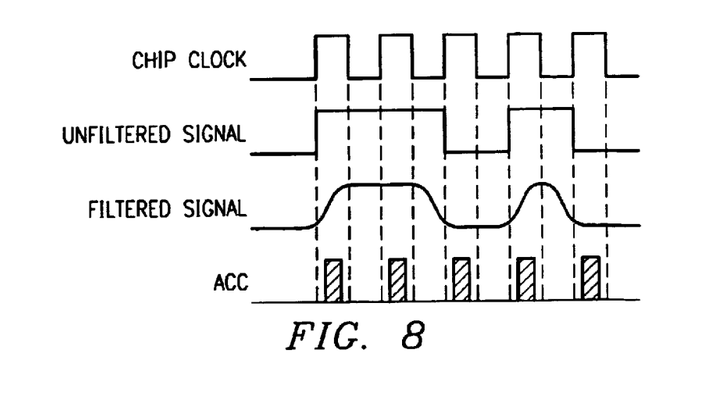
FIG. 8 illustrates a timing diagram for the decoder.
Figure 9:
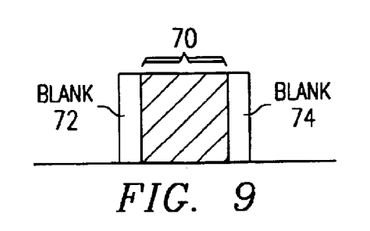
FIG. 9 illustrates a detailed view of the accumulation operation relative to the chip clock.

Referring now to FIG. 8, there is illustrated a timing diagram for the operation described herein. A chip clock is provided which is synchronized to the composite signal that is transmitted. This is illustrated as an unfiltered signal. As noted hereinabove, a smoothing filter is then utilized to result in a filtered signal which basically smooths the transition such that a smaller bandwidth is required. As will be described hereinbelow, to remove the need for synchronizing the sampling operation to the center of a given chip clock and then performing the conventional decode operation, the transition region is neglected, with the remaining waveform being utilized for the accumulation operation of the present embodiment. Therefore, as will be described in more detail hereinbelow, the sum of the products is carried out for only a fraction of the time, compared to a conventional operation with no accumulation performed for the beginning and the end of the chip period. This is illustrated in FIG. 9 for a single chip period wherein there is defined a region 70 over which the sum of the products is performed, an accumulation operation, with the initial portion of the chip period and the final portion of the chip period represented by blanking regions 72 and 74, respectively, over which no accumulation is performed. These are referred to as "blanking regions."

By performing the blanking operation, this effectively provides the "matched filter" function of a normal CDMA decoder operating in a digital domain. Also, this is achieved in the analog domain with the present embodiment rather than in the digital domain. In general, the initial blanking will increase the signal-to-noise ratio dramatically, with additional blanking merely decreasing the overall signal level. Therefore, there is a practical limit to how much blanking is required or necessary to achieve an adequate signal-to-noise ratio without unnecessarily reducing the signal level.

Figure 10:
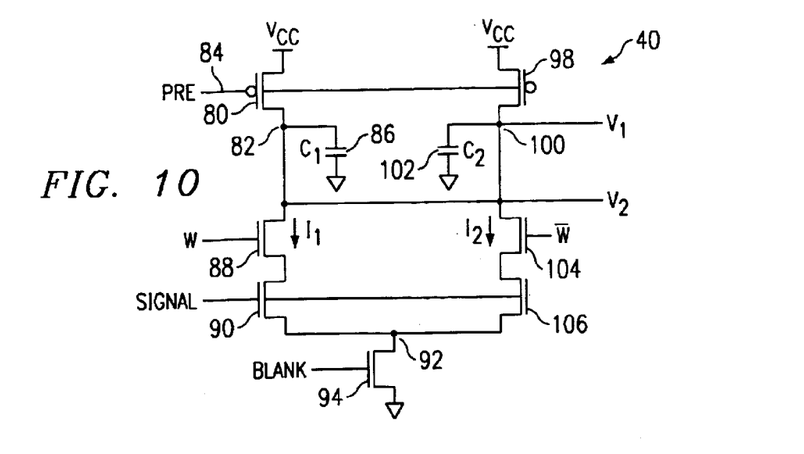
FIG. 10 illustrates a schematic diagram of the accumulator.

Referring now to FIG. 10, there is illustrated a schematic diagram for the MAC block 40 of FIG. 6 for performing the accumulation operation. There are provided two circuit legs, a first circuit leg and a second circuit leg, for performing the accumulation operation. The first circuit leg is comprised of a P-channel transistor 80 having the source/drain thereof connected between a supply voltage Vcc and a node 82. The gate of transistor 80 is connected to a node 84, which is connected to a precharge signal. Node 82 is connected to one side of a capacitor 86 labeled "$C_1$." The other side of capacitor 86 is connected to ground. Node 82 is also connected to one side of the source/drain path of an N-channel transistor 88, the other side thereof connected to one side of the source/drain path of an N-channel transistor 90. The other side of the source/drain path of transistor 90 is connected to a node 92. The gate of transistor 88 is connected to a signal "W" which represents the code word. The gate of transistor 90 is connected to the signal input, which is a signal input which can be biased. Node 92 is connected to one side of the source/drain path of an N-channel transistor 94, the other side thereof connected to ground. The gate of transistor 94 is connected to a "Blanking" signal which is a signal that provides the two regions 72 and 74 of FIG. 9.

The second leg of the circuit of FIG. 10 is similar to the first leg and is comprised of a P-channel transistor 98 similar to transistor 80 and having the source/drain path thereof connected between the power supply Vcc and a node 100, with the gate thereof connected to node 84 and the precharge signal. Node 100 is connected to one side of a capacitor 102, the other side of capacitor 102 connected to ground, capacitor 102 labeled "$C_2$." Node 100 is connected to one side of the source/drain path of an N-channel transistor 104, similar to transistor 88, the other side of the source/drain path of transistor 104 connected to one side of the source/drain path of an N-channel transistor 106. The other side of the source/drain path of transistor 106 is connected to node 92. The gate of transistor 104 is connected to the W-Bar input which is the complement of the W signal or the code word. The gate of transistor 106 is connected to the signal input.

The first leg comprised of transistors 80, 88 and 90 has a current $I_1$ flowing therethrough. The second leg of the circuit of FIG. 10 comprised of transistors 98, 104 and 106 has a current $I_2$ flowing therethrough, these currents only flowing when the Blanking signal is high and transistor 94 conducts.

Figure 11:
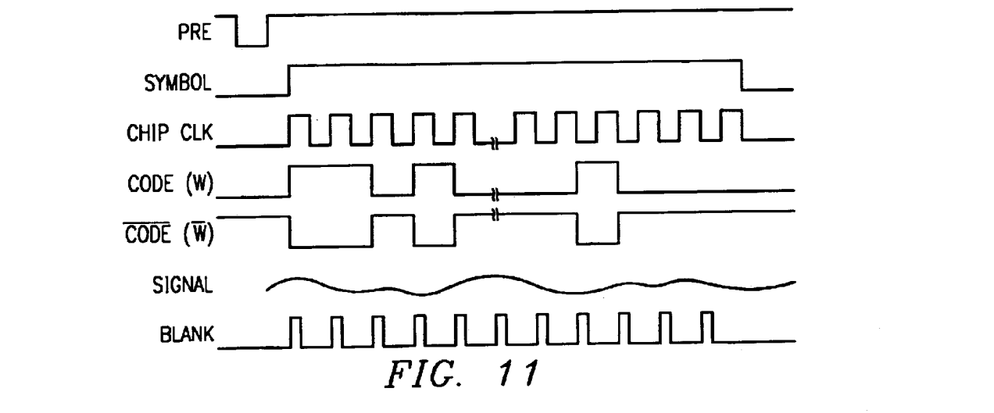
FIG. 11 illustrates a timing diagram for the circuit of FIG. 10.

The circuit of FIG. 10 will be described with reference to a timing diagram of FIG. 11. Initially, the precharge signal on node 80 is pulled low to charge capacitors 86 and 102 up to the supply voltage Vcc. This charge will be stored on capacitors 86 and 102 at the end of the precharge period. Thereafter, the code word W and W-Bar and the signal level will determine the value of the current that will flow through each of the legs as follows:

$$I=k(V_{GS}V_T)V_{DS} \quad (1)$$

$$V_{GS}=S$$

$$V_{DS}=(W-V_T)$$

$$I=K(S-V_T)(W-V_T)$$

where k is the constant proportionality for a single transistor, $V_{GS}$ is the gate-to-source voltage of the transistor 88 and $V_{DS}$ is the drain-to-source voltage.

There are two outputs provided in the circuit, one being the voltage $V_1$ on node 100, and the other being $V_2$ on node 82. The voltage on node 82 after precharge is as follows:

$$V_1=2k(1/C)(V_{0x}S_0+V_{0x}S_1) \quad (2)$$

where:

C is the value of the capacitor, k is the constant and proportionality for one transistor, $V_0$ is the voltage for Walsh-Hadamard code of 0, $V_1$ is the drain voltage for Walsh-Hadarniard code of 1, $S_0$ and $S_1$ are signal values during the appropriate time.

It is noted that the transistors 90 and 106 must be operated in the linear region.

It can be seen that the circuit of FIG. 10 effectively provides a multiplication operation between the code word and the signal which is accumulated over an entire symbol period. This multiplication is effectively the multiplication of the signal, the code and the gain of the amplifier which, after accumulation over a symbol period, will allow the determination of the logic state as to whether it is a "+1," or "-1," or "0." The accumulation operation is provided by the capacitors 86 and 102, which voltage on the capacitor for the next accumulation operation will be reset to zero due to the decay therefrom.

In operation of the circuit of FIG. 10, output nodes 100 and 82 will separate by approximately 500 mV. The voltage difference will be +0.500 mV for a bit value of "+1" and -0.500 mV for a bit value of "-1." This, of course, assumes that the received signal includes only a single channel. In the event that there is more than one channel transmitted, i.e., more than one code is required to extract the data from the data stream, then there is a possibility that there will be some contribution from the other signal during the extraction process. For example, if code 5 were the desired channel, this code would be entered and the receiver essentially "tuned" to that channel. However, if a signal associated with code 7 were also transmitted onto the same frequency, it would be necessary to distinguish between the two signals to determine if the extraction process of the circuit of FIG. 10 will be affected by the presence of this additional signal. The timing diagram for the circuit of FIG. 10 is illustrated in FIG. 11.

In addition to determining the effect that other channels will have upon the extraction process for the desired channel, a calibration procedure is performed wherein the signal is extracted with a given code and signals for other codes transmitted to the receiver. For each other code, the effect upon the extraction process for a Walsh-Hadamard code can then be determined. This is illustrated in a partial simulation in Table 1.

TABLE 1

| | |
|---|---|
| 0 | −7.26623745713035E − 0001 |
| 1 | −1.52004843347296E + 0000 |
| 2 | −4.30762219513426E − 0001 |
| 3 | −1.06018819079423E + 0000 |
| 4 | 8.19324457621845E + 0001 |
| 5 | 2.35935402760704E + 0003 |
| 6 | 7.11393211439934E + 0001 |
| 7 | 1.36039197049655E + 0002 |
| 8 | −6.50473486860345E − 0001 |
| 9 | −1.55951845318670E + 0000 |
| 10 | −5.67634104508843E − 0001 |
| 11 | −1.08078187940761E + 0000 |
| 12 | −6.69892326294754E − 0001 |
| 13 | −1.56614024744463E + 0000 |
| 14 | −3.86197762378700E − 0001 |

In Table 1, the extraction process is performed for code 5 with Walsh-Hadamard waveforms in a ⅝th window, and it can be seen that the value for code 5 in Table 1 is the value of 2.359E+0003. The next largest one is that associated with code 7 which is 1.3E+0002, an order of magnitude less. Therefore, the difference voltage would be approximately 500 mV for code 5 and approximately 50 mV for code 7. The remaining codes are less than 5 mV. As such, one would anticipate that the existence of a "+1" for both code 5 and code 7 would result in the addition of 50 mV to the code 5 signal extraction process. If it were a "−1" for the code 7 signal, then this would be subtracted from the result. This, in effect, provides a cleaner signal for the decision-making process.

Figure 12:
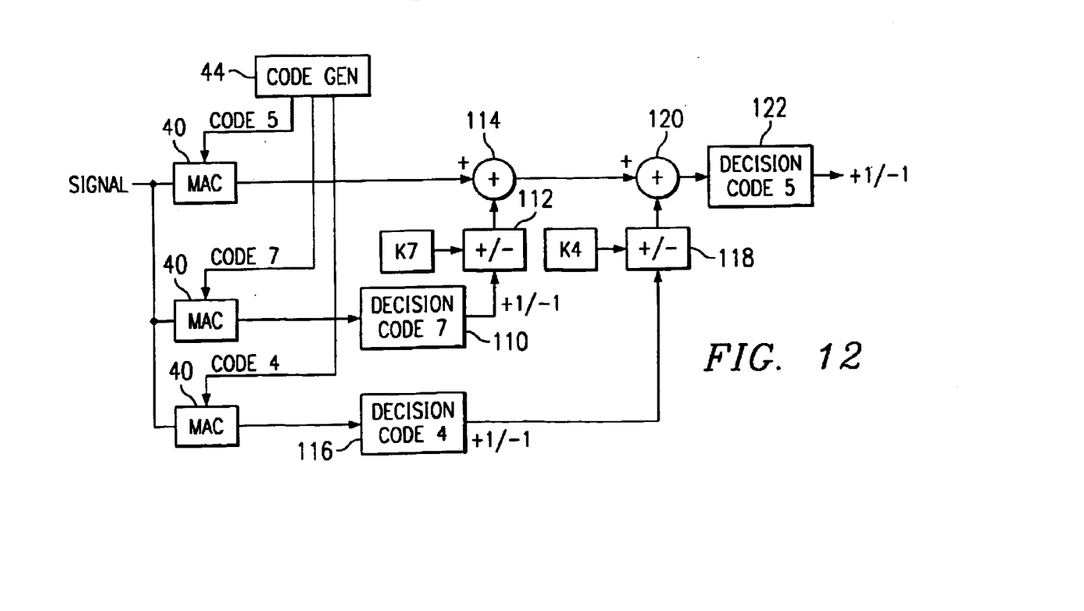
FIG. 12 illustrates a block diagram depicting the structure for performing the subtraction operation.

Referring now to FIG. 12, there is illustrated a block diagram depicting the structure for performing the subtraction operation. There are provided three multiply/accumulator blocks 40, one for code 5, one for code 7 and one for code 4, by way of example. In Table 1, the only important one is code 7 when trying to extract code 5 information. However, for all 256 codes, the contribution thereof is accounted for and subtracted from the extraction process. In the subtraction operation, the separate MAC 40s provided for code 4 and code 7 are operated with their associated codes 7 and 4, respectively. As such, MAC 40 associated with code 7 will essentially be tuned to the signal associated with code 7 and MAC 40 associated with code 4 will essentially be tuned to the signal associated with code 4. Therefore, if a signal exists with code 7, the output of MAC 40 associated with code 7 will be at a voltage +0.500 mV or −0.500 mV. The MAC 40 for code 7 has the output thereof to a separate decision block which makes the decision based upon the tuning of the MAC 40, i.e., it is tuned for the code 7 channel. The output of the decision block 110 provides a +1>−1 decision which is input to a sign change block 112. The block 112 receives the constant value K7, which is the value for code 7 stored in Table 1. As noted hereinabove, this value indicates the contribution to the output of MAC 40 for the code 5 channel that resulted from the presence of a code 7 signal. If the bit value was a +1, then this value K7 would be additive. This additive signal would then be subtracted from the output of the MAC 40 for a code 5 signal with a summation block 114. The reason for having to determine the sign of the code 7 signal is to determine whether the value in Table 1 for the contribution to the output of the code 5 of the MAC 40 from the code 7 signal is to determine whether the contribution is added or subtracted from the signal.

For the code 4 MAC 40, the output thereof is input to a decision box 116, the output thereof providing a +1>−1 decision, depending on the bit value at the end of a bit period. This is an input to the sign change block 118 which receives the constant K4 which represents the contribution for code 4 in Table 1. This is similar to the sign change block 112. The output of sign change block 118, either the positive value of K4 or the negative value of K4, is input to a summation block 120 for summing with the output of the summation block 114. This output is then input to a decision box 122 which is the decision for the code 5 signal. The output of this is a +1/−1 value for the bit value at the end of the bit period.

Figure 13:
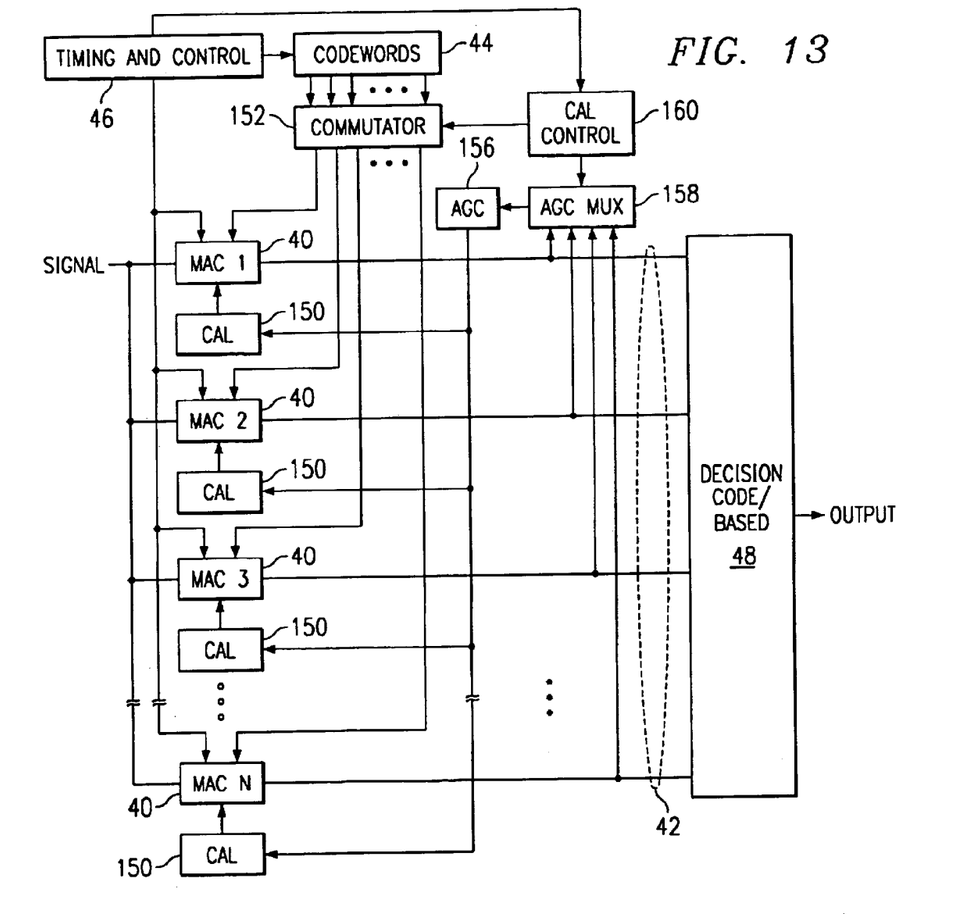
FIG. 13 illustrates a block diagram of a method for calibrating each of the multiply/accumulate blocks.

Referring now to FIG. 13, there is illustrated a block diagram for an alternate embodiment to the embodiment illustrated in FIG. 6 to provide calibration for each of the MAC blocks 40. Since each of the MAC blocks 40 utilizes capacitors as the storage device, the parameters of which may vary relative to each other due to process imperfections, there may be errors associated with the output. This is due to the fact that the values of W and W-Bar applied to the gates of P channel transistors 88 and 104 can have slight variations. This will effect the overall gain parameter which is important in the multiplication/accumulation operation. In order to compensate for this, a calibration block 150 is provided for each MAC block 40 for the purpose of storing calibration information for the associated MAC block 40. In the embodiment of FIG. 13, there is provided a commutator 152 which is operable to, in a calibration mode, selectively direct a predetermined one of the code words from generator 44 to each of the MAC blocks 40. This code word is associated with the "pilot" signal. The pilot signal is a signal that has a known signal level and is known as a relatively strong signal. However, for the purposes of calibration, it is only important that the signal be the same for each MAC block 40 calibrated. Therefore, since all signals are received by each of the MAC blocks 40, it is only necessary to associate each MAC block 40 with a particular code word during calibration to ensure that MAC block 40 actually decodes that particular code word, or that the accumulation operation is associated with that code word.

An AGC circuit 156 is provided which is operable to select through an AGC multiplexer 158 the output of each of the MAC blocks 40. This is provided for generating the calibration values. In general, the calibration values vary the levels of the W and W-Bar inputs to transistors 88 and 104 on the gates thereof, as is described hereinbelow.

In operation, the system will enter the calibration operation via a calibration control block 160. The calibration control block 160 will set the commutator 152 such that the code word associated with the pilot signal in code word block 44 will be selected for a selected one of the MAC blocks 40. The AGC multiplexer 158 will then be controlled to select the output from the selected MAC block 40 for input to the AGC 156. The AGC 156 will set the value in a calibration block 150 for the selected MAC block 40. When completed, the calibration control block 160 will then latch the value in the associated calibration block 150, the latch connection not shown. The calibration operation must be run periodically to account for variations in the signal amplitude. Further, the calibration latch, in the disclosed embodiment hereinbelow, utilizes a capacitor for storing a voltage. This requires a periodic refresh of the capacitor value.

Figure 14:
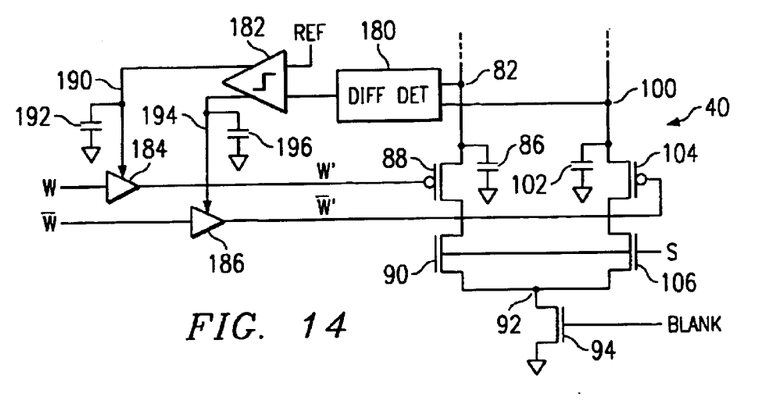
FIG. 14 illustrates a schematic diagram of the AGC and calibration circuitry for the embodiment of FIG. 13.

Referring now to FIG. 14, there is illustrated a more detailed block diagram of the calibration block 150 and the AGC block 156 in association with the MAC block 40 of FIG. 10. The differential outputs on nodes 82 and 100 from the MAC block 40 are input to a differential detection circuit 180, which differential detection circuit 180 is operable to determine the differential voltage between nodes 82 and 100. This voltage is an input to a comparator 182 which compares the detected differential voltage which a reference voltage on a second input to the comparator 182. The comparator 182 is operable to generate two voltages, a voltage reference level for W and a voltage reference level for W-Bar. Each of the W and W-Bar signals are digital signals which are input to drivers 184 and 186, respectively. The outputs provide the signals W' and W-Bar. The difference is that the levels are calibrated. Each of the drivers 184 and 186 switches between a first level and a second level. The first level between drivers 184 and 186 is the same, whereas the second level corresponds to the differential voltage therebetween. The voltage level to which they switch is determined by the comparator 182. This voltage is provided on two lines, a line 190 which voltage level is stored on the capacitor 192 and a second line 194 which voltage level is stored on a capacitor 196. The voltage level on capacitor 192 therefore provides the voltage level for the digital signal W', and the voltage stored on capacitor 196 provides the voltage level for the digital signal W-Bar'.

The comparator 182 essentially generates a series of pulses which pulses result in charging or discharging of the capacitor. If the voltage is too high, these pulses discharge the associated capacitor and, if the voltage is too low, then the voltage is raised by intermittently charging the capacitor. This voltage is only applied to a single "side" of the respective invertors 184 and 186. The other side, as described hereinabove, is set to a common reference voltage.

In summary, there has been provided a low complexity CDMA receiver. This CDMA receiver utilizes a circuit that samples a received signal over less than the entire chip period. The resulting value is utilized to integrate the current in the capacitor to either a positive voltage or a negative voltage when the signal is compared to the code associated with that signal.

Although the preferred embodiment has been described in detail, it should be understood that various changes, substitutions and alterations can be made therein without departing from the spirit and scope of the invention as defined by the appended claims.

What is claimed is:

1. A CDMA decoder for decoding a CDMA encoded signal from a desired CDMA channel, comprising:
    a receive input for receiving a CDMA encoded signal;
    a code generator for generating a predetermined CDMA code for a predetermined CDMA channel that corresponds to an encoded signal encoded with a corresponding CDMA code transmitted over the predetermined CDMA channel;
    a multiply or accumulate device including a multiplication device for multiplying said received signal received on said receive input by said predetermined CDMA code word and operating in the analog domain, said multiply or accumulate device also including an accumulator operable to accumulate the results of the multiplication operation over a symbol period to provide an analog result;
    a data conversion device for determining if the analog result corresponds to a predetermined digital state and, if so, generating a digital output corresponding to said predetermined digital state; and
    a summation device for subtracting the output of said multiplication device from said analog result of said multiply or accumulate device prior to input to said data conversion device associated with said multiply or accumulate device.

2. The CDMA decoder of claim 1, wherein said predetermined digital state comprises multiple predetermined digital states and wherein said data conversion device is operable to generate multiple digital output states corresponding to the one of said multiple predetermined digital states to which the analog result has been determined to correspond.

3. The CDMA decoder of claim 2, wherein said multiple predetermined digital stats correspond to a "+1" logic state, a "0" logic state and a "−1" logic state.

4. The CDMA decoder of claim 1, wherein said data conversion device, by the operation of generating said digital output, provides a correlation of said encoded signal with said generated code word for said CDMA channel.

5. The CDMA decoder of claim 1, wherein said code generator operates in synchronization with a chip clock such that said predetermined CDMA code word is clocked by said chip clock, which chip clock changes from one logic state to a second logic state, and said multiply or accumulate device further including a blanking device for blanking the operation of said multiply or accumulate device during at least one of the leading or lagging edges of said chip clock at said one logic state for a predetermined blanking duration during which the operation of said multiply or accumulate device is inhibited to prevent accumulation of information therefrom.

6. The CDMA decoder of claim 5, wherein said blanking device operates during said leading and lagging edges of the chip clock.

7. The CDMA decoder of claim 1, and further comprising a blanking device for blanking the operation of said multiply or accumulate device for at least one of the leading or the lagging edges of said received signal for a predetermined blanking duration when transitioning between logic states.

8. The CDMA decoder of claim 7, wherein said blanking device is operable to blank said operation of said device for both said leading and lagging edges for said predetermined blanking duration.

9. The CDMA decoder of claim 1, wherein said code generator is operable to generate a plurality of CDMA codes, each associated with one of a plurality of CDMA channels such that said received input can receive a plurality of CDMA encoded signals each on a different channel and further comprising a plurality of multiply or accumulate devices, one for each channel and for each code word generated by said code generator and wherein said data conversion device is operable to determine for each of the multiply or accumulate devices if the associated analog result corresponds to said predetermined digital state and if so, generating a digital output corresponding to the associated multiply or accumulate devices such that a digital output is provided for each of said multiply or accumulate devices.

10. A CDMA decoder for decoding a CDMA encoded signal from a desired CDMA channel, comprising
    a receiving input for receiving a CDMA encoded signal;
    a code generator for generating a predetermined CDMA code for a predetermined CDMA channel that corresponds to an encoded signal encoded with a corresponding CDMA code transmitted over the predetermined CDMA channel, said code generator operable to generate a plurality of CDMA codes, each associated with one of a plurality of CDMA channels such that said received input can receive a plurality of CDMA encoded signals each on a different channel;

a data conversion device for determining if the analog result corresponds to a predetermined digital state and, if so, generating a digital output corresponding to said predetermined digital state;

a plurality of multiply or accumulate devices, one for each channel and for each code word generated by said code generator and wherein said data conversion device is operable to determine for each of the multiply or accumulate devices if the associated analog result corresponds to said predetermined digital state and if so, generating a digital output corresponding to the associated multiply/accumulation device such that a digital output is provided for each of said multiply or accumulate devices;

further comprising a subtraction device for subtracting from the analog result output from each of said multiply or accumulate devices contributions from signals on selective ones of the other channels encoded with their associated CDMA codes.

11. The CDMA decoder of claim 10, wherein said subtraction device comprises:

a table device for storing defined predetermined relationships between the output of each of said multiply or accumulate devices for a signal input thereto on its associated channel and the output therefrom for signals input thereto for selected other channels, said relationship comprising a scale factor for the analog result;

a multiplication device associated with each of said multiplication devices for multiplying the determined digital state from the other of said selected channels output by said associated data conversion device from said multiply or accumulate devices for said selected other channels; and a summation device for subtracting the output of each of said multiplication devices from said analog result of said each multiply or accumulate device prior to input to said data conversion device associated with said each multiply or accumulate device.

12. The CDMA decoder of claim 10, and further comprising an automatic gain control device for adjusting the gain of each of said multiply or accumulate devices.

13. The CDMA decoder of claim 12, further comprising an automatic gain control device for adjusting the gain of each of said multiply or accumulate device, wherein said automatic gain control device comprises:

a multiplexer device for operating in a calibration mode and selecting one of said code words generated by said code generator associated with a reference one of the CDMA channels for input to each of said multiply/accumulation devices;

a gain control device for adjusting the gain on the output of each of said multiply or accumulate devices such that, for the signal received on the reference one of the CDMA channels associated with the given one of said code words, the output signal level can be adjusted to a substantially similar level compared to the remaining multiply or accumulate devices.

14. The CDMA decoder for decoding a CDMA encoded signal from a desired CDMA channel, comprising:

a receive input for receiving a CDMA encoded signal;

a code generator for generating a predetermined CDMA code for a predetermined CDMA channel that corresponds to an encoded signal encoded with a corresponding CDMA code transmitted over the predetermined CDMA channel;

a multiply or accumulate device for multiplying said received signal received on said receive input by said predetermined CDMA code and operating in the analog domain, said multiply or accumulate device operable to accumulate the results of the multiplication operation over a symbol period to provide an analog result; and a data conversion device for determining if the analog result corresponds to a predetermined digital state and, is so, generating a digital output corresponding to said predetermined digital state;

wherein said multiply or accumulate device comprises:

at least one series leg including first and second series connected transistors disposed between a first node and a second reference voltage, said first transistor having the gate thereof connected to the received signal on said receive input and the gate of said second transistor connected to receive said code;

a storage device connected to said first node;

a precharge device for enabling said first node to be precharged to a defined level prior to the initiation of the accumulation operation at the beginning of a symbol period; and wherein said first and second transistors provide a multiplication operation or said code word and the received signal and said storage device is operable to accumulate the results of the multiplication operation over a symbol period.

15. The CDMA decoder of claim 14, wherein said multiply or accumulate device operates in a differential mode and further comprising a second leg comprised of first and second transistors connected in series between a second node an said reference voltage.

16. A method for decoding a CDMA encoded signal from a desired CDMA channel, comprising the steps of:

receiving the CDMA encoded signal on a receive input;

generating a predetermined CDMA code for a predetermined CDMA channel that corresponds to an encoded signal encoded with a corresponding CDMA code transmitted over the predetermined CDMA channel;

providing a multiply/accumulate device including a data conversion device and a multiplication device multiplying the received signal received on the receive input by the predetermined CDMA code in the analog domain and accumulating the result of the multiplying over a symbol period to provide an analog result;

determining if the analog result corresponds to a predetermined digital state; and providing a summation device for subtracting the output of said multiplication devices from said analog result of said multiply or accumulate device prior to input to said data conversion device associated with said multiply/accumulate device.

17. The method of claim 16, wherein the predetermined digital state comprises multiple predetermined digital states, and wherein the step of generating a digital output is operable to generate multiple digital output states, each corresponding to the one of the multiple predetermined digital states to which the analog result has been determined to correspond.

18. The method of claim 16, wherein the step of generating the CDMA code is operable to generate a sequence of logic states that are synchronized with a chip clock such that the predetermined CDMA code is comprised of a plurality of logic states that are clocked by the chip clock, which chip clock changes from one logic state to a second logic state and the step of multiplying and the step of accumulating further including the step of blanking the operation of multiplying and accumulating during at least one of the leading or lagging edges of the chip clock at the one logic state for a predetermined blanking duration during which the multiplying and accumulation steps are inhibited to prevent accumulation of information therefrom.

19. The method of claim 18, wherein the step of blanking operates only during the leading and lagging edges of the chip clock.

20. The method of claim 16, wherein the step of generating the predetermined CDMA code is operable to generate a plurality of CDMA codes, each associated with one of a plurality of CDMA channels such that the receive input can receive a plurality of CDMA encoded signals each on a different channel and further comprising the step of providing a plurality of multiply or accumulate devices, each for carrying out the multiplying and accumulation steps for a given one of the CDMA channels and wherein the step of determining for each of the multiply or accumulate devices is operable to determine if the associated analog result corresponds to the predetermined digital state and, if so, generating a digital output corresponding to the associated multiply or accumulate device such that a digital output is provided for each of the multiply or accumulate devices.

21. A method for decoding a CDMA encoded signal from a desired CDMA channel, comprising the steps of:

receiving the CDMA encoded signal on a receive input;

generating a predetermined CDMA code for a predetermined CDMA channel that corresponds to an encoded signal encoded with a corresponding CDMA code transmitted over the predetermined CDMA channel;

multiplying in a multiplication operation the received signal received on the receive input by the predetermined CDMA code in the analog domain and accumulating the result of the multiplication operation over a symbol period to provide an analog result; determining if the analog result corresponds to a predetermined digital sate and, if so, generating a digital output corresponding to the predetermined digital state;

wherein the step of generating the predetermined CDMA code is operable to generate a plurality of CDMA codes, each associated with one of a plurality of CDMA channels such that the receive input can receive a plurality of CDMA encoded signals, each signal on a different channel and further comprising the step of providing a plurality of multiply or accumulate devices, each for carrying out the multiplying and accumulation steps for a given one of the CDMA channels and wherein the step of determining for each of the multiply or accumulate devices is operable to determine if the associated analog result corresponds to the predetermined digital state and, if so, generating a digital output corresponding to the associated multiply or accumulate device such that a digital output is provided for each of the multiply or accumulate devices;

further comprising the step of subtracting from the analog result output from each of the multiply or accumulate devices contributions from signals on selective ones of the other channels encoded with their associated CDMA codes.

* * * * *